(12) United States Patent
Wang et al.

(10) Patent No.: US 12,367,259 B2
(45) Date of Patent: Jul. 22, 2025

(54) METHOD, ELECTRONIC DEVICE, AND COMPUTER PROGRAM PRODUCT FOR TRAINING MODEL

(71) Applicant: Dell Products L.P., Round Rock, TX (US)

(72) Inventors: Zijia Wang, WeiFang (CN); Danqing Sha, Shanghai (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 635 days.

(21) Appl. No.: 17/588,515

(22) Filed: Jan. 31, 2022

(65) Prior Publication Data

US 2023/0214450 A1 Jul. 6, 2023

(30) Foreign Application Priority Data

Dec. 31, 2021 (CN) .......................... 202111665428.4

(51) Int. Cl.
*G06F 18/214* (2023.01)
*G06F 18/25* (2023.01)
(Continued)

(52) U.S. Cl.
CPC .......... *G06F 18/214* (2023.01); *G06F 18/253* (2023.01); *G06F 40/126* (2020.01); *G06V 20/46* (2022.01); *G06V 40/168* (2022.01)

(58) Field of Classification Search
CPC .... G06F 18/214; G06F 18/253; G06F 40/126; G06F 40/20; G06T 13/40; G06V 10/764;
(Continued)

(56) References Cited

U.S. PATENT DOCUMENTS 11,763,086 B1 * 9/2023 Sandu .................... G06N 3/045
704/9
2022/0405537 A1 * 12/2022 Yang ..................... G06F 18/256

FOREIGN PATENT DOCUMENTS

CN 111382555 * 7/2020 .......... G06F 18/241
CN 112203122 * 1/2021 .......... H04N 21/251
(Continued)

OTHER PUBLICATIONS

J. Liu et al., "OPT: Omni-Perception Pre-Trainer for Cross-Modal Understanding and Generation," arXiv:2107.00249v2, Jul. 6, 2021, 10 pages.
(Continued)

*Primary Examiner* — Zhiyu Lu
(74) *Attorney, Agent, or Firm* — Ryan, Mason & Lewis, LLP (57) ABSTRACT

Embodiments of the present disclosure provide a method, an electronic device, and a computer program product for training a model. The method may include determining image features, audio features, and text features of a reference object based on reference image information, reference audio information, and reference text information associated with the reference object, respectively. The method may also include constructing a feature tensor from the image features, the audio features, and the text features. In addition, the method may further include decomposing the feature tensor into a first feature vector, a second feature vector, and a third feature vector corresponding to the image features, the audio features, and the text features, respectively, to determine a loss function value of the model. The method may also include updating parameters of the model based on the loss function value.

20 Claims, 4 Drawing Sheets

(51) Int. Cl.
   *G06F 40/126*   (2020.01)
   *G06V 20/40*    (2022.01)
   *G06V 40/16*    (2022.01)
(58) Field of Classification Search
   CPC .. G06V 10/7747; G06V 10/806; G06V 20/46;
                        G06V 40/168; G06V 40/174
   See application file for complete search history.

(56) References Cited

FOREIGN PATENT DOCUMENTS

| | | | | |
|---|---|---|---|---|
| CN | 112329604 | * | 2/2021 | ........... G06F 18/214 |
| CN | 113569052 | * | 10/2021 | ............. G06F 16/36 |
| CN | 113011568 | * | 6/2024 | ............. G06F 17/16 |

OTHER PUBLICATIONS

G. Gafni et al., "Dynamic Neural Radiance Fields for Monocular 4D Facial Avatar Reconstruction," arXiv:2012.03065v1, Dec. 5, 2020, 11 pages.

* cited by examiner

METHOD, ELECTRONIC DEVICE, AND COMPUTER PROGRAM PRODUCT FOR TRAINING MODEL

RELATED APPLICATION(S)

The present application claims priority to Chinese Patent Application No. 202111665428.4, filed Dec. 31, 2021, and entitled "Method, Electronic Device, and Computer Program Product for Training Model," which is incorporated by reference herein in its entirety.

FIELD

Embodiments of the present disclosure relate to the field of data processing, and more particularly, to a method, an electronic device, and a computer program product for training a model.

BACKGROUND

The application of technologies for intelligently and digitally reconstructing, for example, a face of a speaking person is the key to research in many fields. Therefore, reconstruction of three-dimensional or higher-dimensional visual representations based on image or video information and corresponding audio and text information has a wide range of application scenarios in many fields. Importantly, humans can acquire information and learn knowledge by watching, listening, and reading, i.e., the primary way in which humans learn is to explore multi-modal resources including image, audio, and text information. Generalized to the field of machine learning or artificial intelligence, machines with human-like intelligence should also be trained based on multi-modal resources. However, there is currently a lack of effective cross-modal model training schemes.

SUMMARY

Embodiments of the present disclosure provide a solution for training a model.

In a first aspect of the present disclosure, a method for training a model is provided. The method may include determining image features, audio features, and text features of a reference object based on reference image information, reference audio information, and reference text information associated with the reference object, respectively. The method may also include constructing a feature tensor from the image features, the audio features, and the text features. In addition, the method may further include decomposing the feature tensor into a first feature vector, a second feature vector, and a third feature vector corresponding to the image features, the audio features, and the text features, respectively, to determine a loss function value of the model. The method may also include updating parameters of the model based on the loss function value.

In a second aspect of the present disclosure, an electronic device is provided, including: a processor; and a memory coupled to the processor and having instructions stored therein which, when executed by the processor, cause the electronic device to perform actions for training a model, the actions comprising: determining image features, audio features, and text features of a reference object based on reference image information, reference audio information, and reference text information associated with the reference object, respectively; constructing a feature tensor from the image features, the audio features, and the text features; decomposing the feature tensor into a first feature vector, a second feature vector, and a third feature vector corresponding to the image features, the audio features, and the text features, respectively, to determine a loss function value of the model; and updating parameters of the model based on the loss function value.

In a third aspect of the present disclosure, a computer program product is provided. The computer program product is tangibly stored on a non-transitory computer-readable medium and includes machine-executable instructions that, when executed by a machine, cause the machine to perform any steps of the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent from the following detailed description of example embodiments of the present disclosure with reference to the accompanying drawings, where identical or similar reference numerals generally represent identical or similar components in the example embodiments of the present disclosure. In the accompanying drawings.

DETAILED DESCRIPTION

The principles of the present disclosure will be described below with reference to several example embodiments illustrated in the accompanying drawings.

The term "include" used herein and variants thereof indicate open-ended inclusion, that is, "including but not limited to." Unless otherwise stated, the term "or" means "and/or." The term "based on" denotes "at least partially based on." The terms "an example embodiment" and "an embodiment" indicate "a group of example embodiments." The term "another embodiment" indicates "a group of additional embodiments." The terms "first," "second," and the like may refer to different or the same objects. Other explicit and implicit definitions may also be included below.

As mentioned above, conventional three-dimensional or higher-dimensional reconstruction techniques are usually based only on two-dimensional image information. To more accurately and faithfully reconstruct high-dimensional visual representations, three-dimensional reconstruction techniques across multiple modalities have been proposed. For example, three-dimensional or higher-dimensional visual identifiers can be reconstructed using reconstruction information in three modalities, that is, two-dimensional video information (i.e., image information) and its corresponding audio information and text information. It should be understood that, in addition to two-dimensional video information, audio information can be used to more precisely control a mouth shape of a person or an object, and text information can be used to more finely reflect mood and expression of a person or an object.

Cross-modal high-dimensional visual representation reconstruction techniques can have a wide range of application scenarios. For tele-presence applications in AR or VR, it is required to faithfully reproduce the appearance of head poses, mouth shapes, facial expressions, etc. Especially in educational scenarios, reconstructed virtual visual representations of students can protect the privacy of the students. In addition, it can also help disabled people hide their shortcomings, so that they can play and run in virtual worlds like other people.

However, conventional research on cross-modal high-dimensional visual representation reconstruction techniques usually only considers two modalities. Even if three-modal resources are used in some explorations, the information is directly spliced and applied. In a conventional model training process, information resources of the three modalities are not fully learned and include unwanted noise. Therefore, the current cross-modal high-dimensional visual representation reconstruction technology still has the problems of low efficiency and low accuracy.

In view of this, a model training scheme is provided in embodiments of the present disclosure. In this scheme, image information, audio information, and text information in a training dataset can all be input into corresponding encoders to obtain corresponding image features, audio features, and text features. Furthermore, in order to improve the training effect, the acquired image features, audio features, and text features can be constructed as a feature tensor, i.e., a three-dimensional matrix. Afterwards, the feature tensor can be decomposed into a first feature vector, a second feature vector, and a third feature vector corresponding to the image features, audio features, and text features, and noise information using a known tensor decomposition algorithm. Correlation and de-noising of cross-modal information is achieved in this way, thereby optimizing the model training process. The model trained in this way can reconstruct more realistic visual identifiers such as facial features and actions, thus optimizing the user experience.

Figure 1:
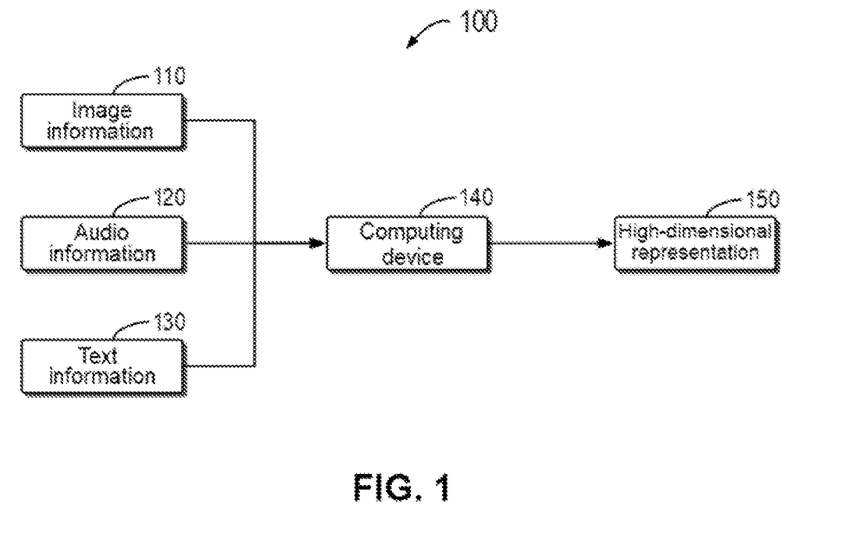
FIG. 1 illustrates a schematic diagram of an example environment in which multiple embodiments of the present disclosure can be implemented.

Embodiments of the present disclosure will be specifically described below with reference to the accompanying drawings. FIG. 1 illustrates a schematic diagram of example environment 100 in which multiple embodiments of the present disclosure can be implemented. As shown in FIG. 1, example environment 100 contains multi-modal information resources from a user, e.g., image information 110, audio information 120, and text information 130. In some embodiments, image information 110 may be video information composed of a plurality of frames of images, and in subsequent processing, image information 110 may be a sub-image of at least one region in one or more frames of images. Audio information 120 may be at least one segment of sub-audio in an audio resource. Text information 130 may be at least one sign, character, or word in a text resource.

As shown in FIG. 1, example environment 100 may include computing device 140. Computing device 140 may be configured to receive image information 110, audio information 120, and text information 130 associated with user's operations, and to determine or reconstruct high-dimensional representation 150 of the user through computation.

In some embodiments, computing device 140 may include, but is not limited to, a personal computer, a server computer, a handheld or laptop device, a mobile device (such as a mobile phone, a personal digital assistant PDA, or a media player), a consumer electronic product, a minicomputer, a mainframe computer, a cloud computing resource, and so on. It should be understood that, based on factors such as cost, computing device 140 may or may not have sufficient computing resources for model training.

In some embodiments, high-dimensional representation 150 may be a virtual three-dimensional or higher-dimensional image or animation used to reproduce facial expressions, actions, and the like of a user.

It should be understood that the architecture and functions of example environment 100 are described for illustrative purposes only, without implying any limitation to the scope of the present disclosure. Embodiments of the present disclosure may also be applied to other environments having different structures and/or functions.

Figure 2:
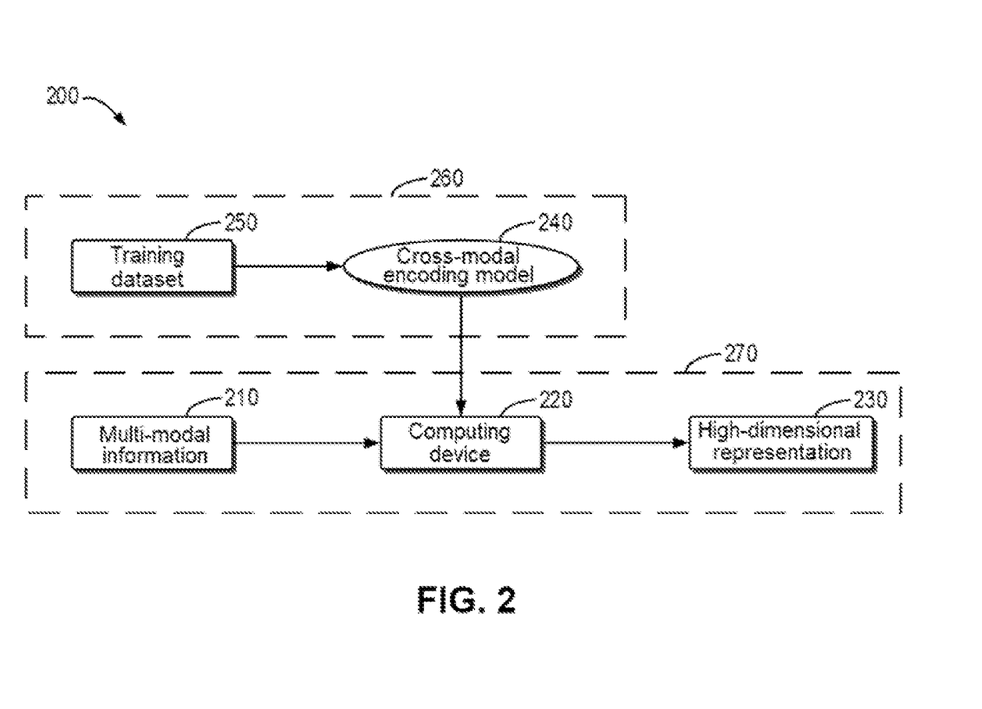
FIG. 2 illustrates a schematic diagram of a detailed example environment for training and applying a model according to an embodiment of the present disclosure.

In order to describe a training process of the image processing model in further detail, the training and application process of the model will be described below with reference to FIG. 2. FIG. 2 illustrates a schematic diagram of detailed example environment 200 for training and applying a model according to an embodiment of the present disclosure. As shown in FIG. 2, example environment 200 may generally include model training system 260 and model application system 270. As an example, model training system 260 and/or model application system 270 may be implemented in computing device 140 as shown in FIG. 1. It should be understood that the structure and functions of example environment 200 are described for illustrative purposes only, and are not intended to limit the scope of the subject matter described herein. The subject matter described herein may be implemented in different structures and/or functions.

As mentioned above, the process of reconstructing low-dimensional multi-modal information resources into high-dimensional representations can be divided into two stages: a model training stage and a model application stage. As an example, in the model training stage, model training system 260 can use training dataset 250 to train cross-modal encoding model 240 used to perform corresponding functions. In the model application stage, model application system 270 may receive trained cross-modal encoding model 240. Thus, cross-modal encoding model 240 loaded into computing device 220 of model application system 270 can reconstruct high-dimensional representation 230 based on any input multi-modal information 210.

In other embodiments, cross-modal encoding model 240 may be constructed as a learning network. In some embodiments, this learning network may include multiple networks, wherein each network may be a multilayer neural network that may be constituted by a large number of neurons. Through the training process, corresponding parameters of the neurons in each of the networks can be determined. Parameters of the neurons in these networks are collectively referred to as parameters of cross-modal encoding model 240.

The training process of cross-modal encoding model 240 may be performed in an iterative manner until at least some of the parameters of cross-modal encoding model 240 converge or until a predetermined number of iterations is reached, thereby obtaining final model parameters.

The technical solution described above is only used as an example, and does not limit the present disclosure. It should be understood that the networks may also be disposed according to other manners and connection relationships. In order to explain the principle of the above solution more clearly, the process for training a model will be described in more detail below with reference to FIG. 3.

Figure 3:
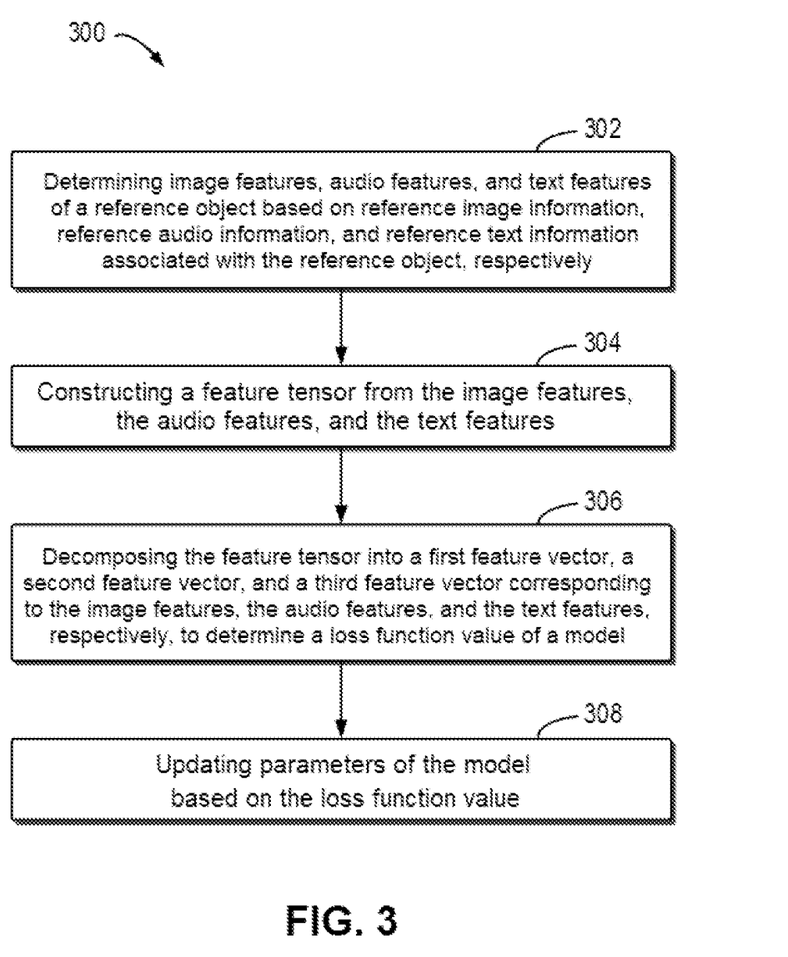
FIG. 3 illustrates a flow chart of a process for training a model according to an embodiment of the present disclosure.

FIG. 3 illustrates a flow chart of process 300 for training a model according to an embodiment of the present disclosure. In some embodiments, process 300 may be implemented in computing device 140 in FIG. 1 or other computing devices. Process 300 for training a model according to an embodiment of the present disclosure will now be described with reference to FIG. 3 in combination with FIG. 1. For ease of understanding, specific examples mentioned in the following description are all illustrative and are not used to limit the protection scope of the present disclosure.

At 302, computing device 140 may determine image features, audio features, and text features of a reference object based on reference image information, reference audio information, and reference text information associated with the reference object, respectively. In some embodiments, the reference object may be a human face, i.e., the reference image information, the reference audio information, and the reference text information are all derived from a training dataset related to human facial activity. Alternatively or additionally, the reference object may also be body language, actions, etc. of human or other objects. In some embodiments, the reference image information may be a sub-image of at least one region in one or more frames of images, the reference audio information may be at least a segment of sub-audio in an audio resource, and the reference text information may be at least one sign, character, or word in a text resource.

In some embodiments, in order to determine the above-mentioned image features, audio features, and text features, computing device 140 may use a preset video encoder to determine the image features based on the reference image information, use a preset audio encoder to determine the audio features based on the reference audio information, and use a preset text encoder to determine the text features based on the reference text information. As an example, Fast R_CNN can be used as the video encoder, wave2vec 2.0 can be used as the audio encoder, and BERT can be used as the text encoder to determine the image features, the audio features, and the text features respectively.

At 304, computing device 140 may construct a feature tensor from the determined image features, audio features, and text features. In some embodiments, computing device 140 may arrange the determined image features, audio features, and text features along first, second, and third coordinates, respectively, to form a three-dimensional space. As an example, if the image features correspond to X sub-images, the audio features correspond to Y sub-audios, and the text features correspond to Z characters or words, a three-dimensional feature tensor of X×Y×Z can be constructed.

It should be understood that a position in the three-dimensional space corresponds to a combination of an image feature of the image features, a corresponding audio feature of the audio features, and a corresponding text feature of the text features. As an example, in the coordinate system of the above three-dimensional space, a coordinate (1, 1, 1) may correspond to a combination of a first image feature, a first audio feature, and a first text feature.

In addition, in order to construct the feature tensor, computing device 140 may also determine a value of a corresponding coordinate position based on pre-labeled associated information of the above-mentioned combination to form a part of the feature tensor. As an example, during the model training process, one or two features in a combination of specific image features, audio features, and text features may be replaced, so that there is a mismatching situation among image features, audio features, and text features. Thus, various matching or mismatching situations can be assigned with values, that is, associated information. For example, a situation where image features, audio features, and text features match can be determined as 1; a situation where image features and audio features match and text features mismatch can be determined as 2; a situation where image features and text features match and audio features mismatch can be determined as 3; a situation where audio features and text features match and image features mismatch can be determined as 4; and a situation where all of image features, audio features, and text features mismatch can be determined as 5. In this way, corresponding associated information can be filled in all coordinates of the feature tensor, so the associated information among the modalities will be considered throughout the following training process.

At 306, computing device 140 may decompose the constructed feature tensor into a first feature vector, a second feature vector, and a third feature vector corresponding to the above determined image features, audio features, and text features, respectively, to determine a loss function value of the model.

In some embodiments, the CANDECOMP/PARAFAC decomposition (i.e., CP decomposition) algorithm may be specifically utilized to decompose the feature tensor into three feature vectors and noise. Thus, the first feature vector, the second feature vector, and the third feature vector can be obtained. The first feature vector, the second feature vector, and the third feature vector each comprise the associated information of the feature tensor which has been de-noised. It should be understood that the present disclosure is applicable to other decomposition algorithms that decompose a tensor into bibliographic-specific vectors.

In some embodiments, a specific manner of determining the loss function value may be that computing device 140 determines the loss function value of the model based on the first feature vector, the second feature vector, the third feature vector, and the corresponding image features, audio features, and text features. As an example, absolute values of differences between the first feature vector and the image features, between the second feature vector and the audio features, and between the third feature vector and the text features may be separately determined and summed.

At 308, computing device 140 may update parameters of the model based on the determined loss function value. Similar to conventional model training methods, computing device 140 may adjust the parameters of the model based on the determined loss function value until the loss function value is minimized, and thus a converged model may be trained.

Figure 4:
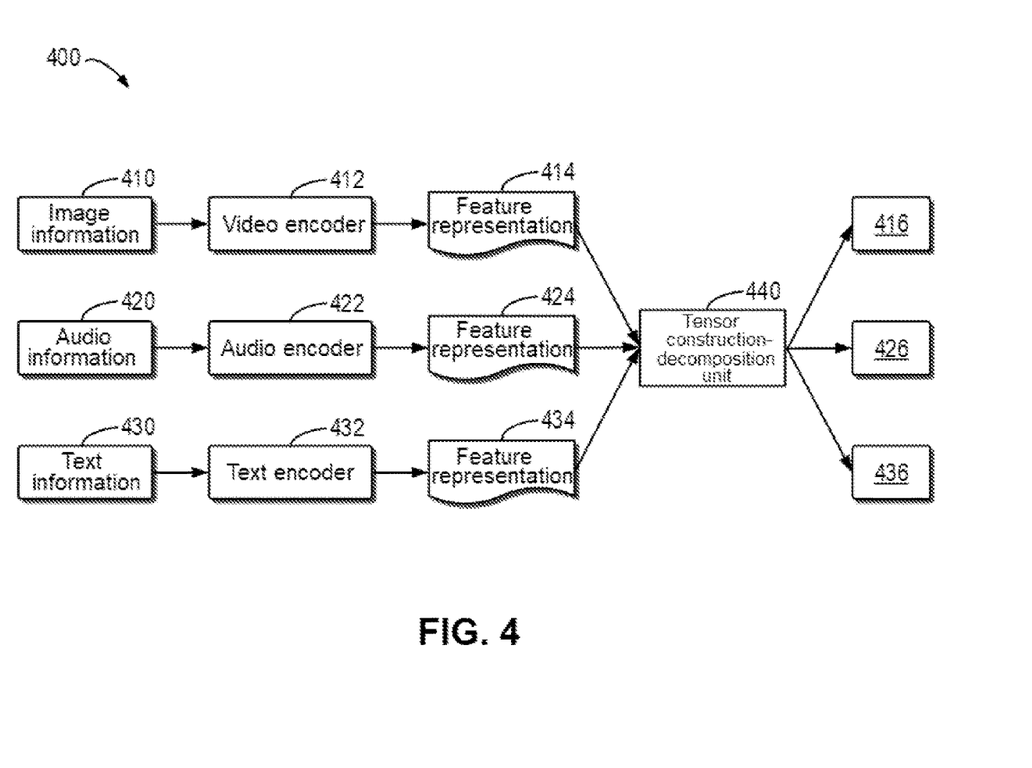
FIG. 4 illustrates a schematic diagram of an example environment for constructing and decomposing a tensor according to an embodiment of the present disclosure.

In order to explain example embodiments of the present disclosure in more detail, the process of constructing a feature tensor and decomposing the feature tensor will now be described in detail with reference to FIG. 4. FIG. 4 illustrates a schematic diagram of example environment 400 for constructing and decomposing a tensor according to an embodiment of the present disclosure.

As shown in FIG. 4, after image information 410, audio information 420, and text information 430 are input to a computing device for training a model, video encoder 412 in the computing device will process image information 410 to obtain corresponding feature representation 414. Similarly and in parallel, audio encoder 422 in the computing device will process audio information 420 to obtain corresponding feature representation 424. Text encoder 432 in the computing device will process text information 430 to obtain corresponding feature representation 434. As an example, video encoder 412 may be R_CNN, audio encoder 422 may be wave2vec 2.0, and text encoder 432 may be BERT.

Tensor construction-decomposition unit 440 first constructs feature representation 414, feature representation 424, and feature representation 434 into a feature tensor. As an example, tensor construction-decomposition unit 440 may construct an X×Y×Z three-dimensional feature tensor from image features corresponding to X sub-images, audio features corresponding to Y sub-audios, and text features corresponding to Z characters or words.

After that, tensor construction-decomposition unit 440 can use any tensor decomposition algorithm to decompose the above three-dimensional feature tensor into first feature vector 416, second feature vector 426, the third feature vector 436, and noise. In this way, de-noised vector representations can be obtained.

Through the above processing, de-noised first feature vector 416, second feature vector 426, and third feature vector 436 can be obtained. Therefore, the loss function value of the model can be more accurately determined based on first feature vector 416, second feature vector 426, third feature vector 436, feature representation 414, feature representation 424, and feature representation 434, thereby optimizing the model training process.

Figure 5:
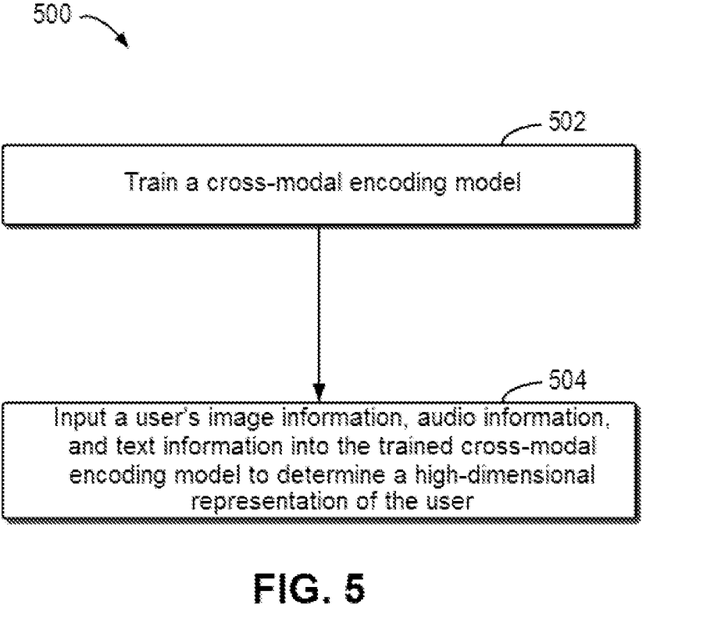
FIG. 5 illustrates a flow chart of a process for applying a trained cross-modal encoding model according to an embodiment of the present disclosure.

It should be understood that after cross-modal encoding model 240 is trained, the model can be applied as shown in FIG. 1. FIG. 5 illustrates a flow chart of process 500 for applying trained cross-modal encoding model 240 according to an embodiment of the present disclosure. In some embodiments, process 500 may be implemented in computing device 140 in FIG. 1 or other devices. Process 500 for applying a model according to an embodiment of the present disclosure will now be described with reference to FIG. 5 in combination with FIG. 1. For ease of understanding, specific examples mentioned in the following description are all illustrative and are not used to limit the protection scope of the present disclosure.

At 502, computing device 140 may train cross-modal encoding model 240 as described in the embodiments above. In some embodiments, for example, when the computing power of computing device 140 is insufficient, cross-modal encoding model 240 may not be trained using computing device 140, but models trained via other computing devices with stronger computing power may be loaded directly into computing device 140.

At 504, computing device 140 may input a user's image information 110, audio information 120, and text information 130 into trained cross-modal encoding model 240 to determine a high-dimensional representation of the user. As an example, a three-dimensional, four-dimensional, or higher-dimensional virtual representation of the user's face may be obtained. It should be understood that specific processes of determining high-dimensional virtual representations based on a cross-modal encoding model have been mentioned in many research articles (such as Guy Gafni et al., "Dynamic Neural Radiance Fields for Monocular 4D Facial Avatar Reconstruction," in: CoRR abs/2012.03065 (2020), arXiv: 2012.03065), which will not be repeated herein.

Through the above-described embodiments, the present disclosure provides a novel reconstruction framework for high-dimensional virtual representations, which integrates three modalities during model training. Furthermore, the present disclosure improves a cross-modal pre-training framework using a tensor decomposition algorithm, so that model training takes into account more information (such as associated information between modalities) and excludes noisy information. Thus, the model training method of the present disclosure improves the model training efficiency and accuracy, and the trained model can reconstruct more realistic visual identifiers such as facial features and actions, thereby optimizing user experience.

Figure 6:
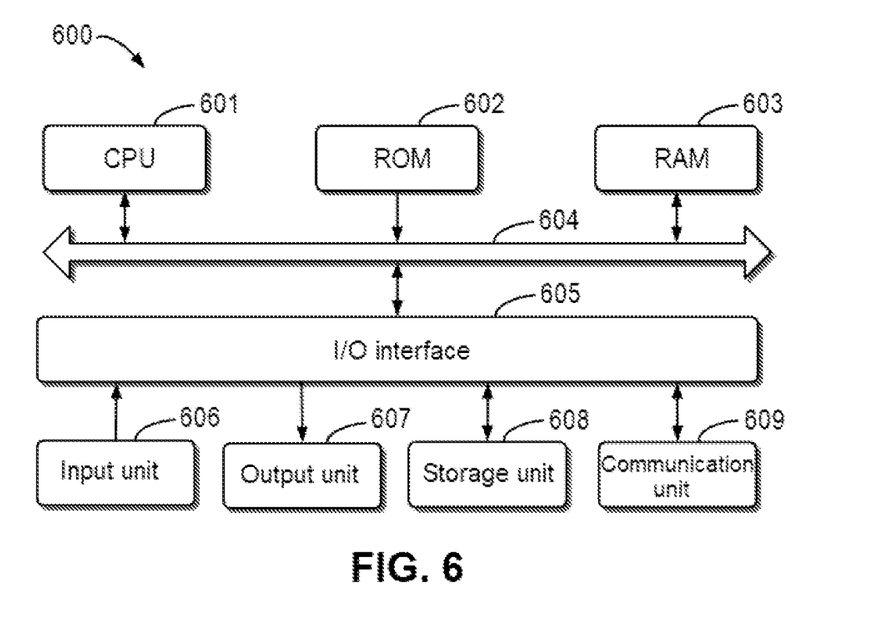
FIG. 6 illustrates a block diagram of a computing device that can implement a plurality of embodiments of the present disclosure.

FIG. 6 illustrates a block diagram of computing device 600 that can implement a plurality of embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing devices, cellular telephones, smartphones, wearable devices, and other similar computing devices. Components, their connections and relationships, and their functions shown herein are only used as examples and are not intended to limit the implementations of the present disclosure described and/or claimed herein.

As shown in FIG. 6, device 600 includes central processing unit (CPU) 601 that may perform various appropriate actions and processing according to a computer program stored in read-only memory (ROM) 602 or a computer program loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

CPU 601 may be various general-purpose and/or special-purpose processing components with processing and computing capabilities. Some examples of CPU 601 include, but are not limited to, graphics processing units (GPUs), various specialized artificial intelligence (AI) computing chips, various computing units that run machine learning model algorithms, digital signal processors (DSP), and any suitable processor, controller, microcontroller, etc. CPU 601 performs the various methods and processing described above, such as processes 300 and 500. For example, in some embodiments, processes 300 and 500 may be implemented as a computer software program that is tangibly included in a machine-readable medium, for example, storage unit 608. In some embodiments, part of or all the computer program may be loaded and/or installed onto device 600 via ROM 602 and/or communication unit 609. When the computer program is loaded to RAM 603 and executed by CPU 601, one or more steps of processes 300 and 500 described above may be performed. Alternatively, in other embodiments, CPU 601 may also be configured to implement processes 300 and 500 in any other suitable manners (such as by means of firmware).

Various implementations of the systems and techniques described herein may be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), computer hardware, firmware, software, and/or combinations thereof. These implementations may include: the implementations are performed in one or more computer programs which can be executed and/or interpreted on a programmable system including at least one programmable processor, and the programmable processor can be a special-purpose or general-purpose programmable processor, which can receive data and instructions from a storage system, at least one input device, and at least one output device, and transmit the data and instructions to the storage system, the at least one input device, and the at least one output device.

Program code for implementing the method of the present disclosure may be written by using one programming language or any combination of a plurality of programming languages. The program code may be provided to a processor or controller of a general-purpose computer, a special-purpose computer, or other programmable data processing apparatuses, such that the program code, when executed by the processor or controller, causes the functions/actions specified in the flow charts and/or block diagrams to be implemented. The program code can be completely executed on a machine, partially executed on a machine, partially executed on a machine as an independent software package and partially executed on a remote machine, or completely executed on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. For example, the machine-readable medium may be, but is not limited to, an electronic, magnetic, optical, electromagnetic, infrared, or semiconductor system, apparatus, or device, or any suitable combination of the above. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof.

To provide interaction with a user, the systems and techniques described herein can be implemented on a computer having: a display device (for example, a cathode ray tube (CRT) or liquid crystal display (LCD) monitor) for displaying information to a user; and a keyboard and a pointing device (for example, a mouse or a trackball) through which a user can provide input to the computer. Other kinds of devices may also be used to provide interaction with the user; for example, the feedback provided to the user may be any form of sensory feedback (e.g., visual feedback, auditory feedback, or tactile feedback); and additionally, input from the user may be received in any form (including acoustic input, voice input, or tactile input).

The systems and techniques described herein can be implemented on a computing system that includes back-end components (e.g., as a data server), or a computing system that includes middleware components (e.g., an application server), or a computing system that includes front-end components (e.g., a user computer having a graphical user interface or a web browser through which a user can interact with implementations of the systems and techniques described herein), or a computing system including any combination of such backend components, middleware components, or front-end components. The components of the system may be mutually connected through digital data communication (for example, a communication network) in any form or medium. An example of the communication network includes: a local area network (LAN), a wide area network (WAN), and the Internet.

The computer system may include a client terminal and a server. The client terminal and the server are generally remote from each other and usually interact through a communication network. A relationship between the client terminal and the server is generated by computer programs that run on corresponding computers and have a client terminal-server relationship with each other.

It should be understood that steps may be reordered, added, or deleted using the various forms of processes shown above. For example, the steps recorded in the present disclosure may be performed in parallel, may be performed sequentially, or may be performed in different orders as long as the desired results of the technical solution disclosed by the present disclosure are achieved, and there is no restriction herein.

The above specific implementations do not constitute a limitation to the protection scope of the present disclosure. It will be apparent to those skilled in the art that various modifications, combinations, sub-combinations, and substitutions may be performed according to design requirements and other factors. Any modifications, equivalent replacements, and improvements made within the spirit and principles of the present disclosure shall be included in the scope of protection of the present disclosure.

What is claimed is:

1. A method for training a model, comprising:
   determining image features, audio features, and text features of a reference object, in respective ones of a video encoder, an audio encoder and a text encoder, based on reference image information, reference audio information, and reference text information associated with the reference object, respectively;
   constructing a feature tensor from the image features, the audio features, and the text features, the feature tensor defining a multi-dimensional space in which a given position within the multi-dimensional space corresponds to a combination of a corresponding image feature of the image features, a corresponding audio feature of the audio features, and a corresponding text feature of the text features, wherein a match type indicating a relationship between the corresponding image feature, the corresponding audio feature and the corresponding text feature is represented in the feature tensor as a particular one of a plurality of values each indicating a different match type;
   decomposing the feature tensor into a first feature vector, a second feature vector, and a third feature vector corresponding to the image features, the audio features, and the text features, respectively, to determine a loss function value of the model, wherein the loss function value is computed at least in part based on a combination of a first absolute value of a difference between the first feature vector and one or more of the image features, a second absolute value of a difference between the second feature vector and one or more of the audio features, and a third absolute value of a difference between the third feature vector and one or more of the text features; and updating parameters of the model based on the loss function value;

wherein the method is performed by at least one processing device comprising a processor coupled to a memory.

2. The method of claim 1, wherein determining the loss function value comprises:

determining the loss function value of the model based on the first feature vector, the second feature vector, the third feature vector, and the corresponding image features, audio features, and text features.

3. The method of claim 1, wherein constructing the feature tensor comprises:

arranging the image features, the audio features, and the text features respectively along a first coordinate, a second coordinate, and a third coordinate to form a three-dimensional space, a given position in the three-dimensional space corresponding to a combination of the corresponding image feature of the image features, the corresponding audio feature of the audio features, and the corresponding text feature of the text features; and determining a value of the position based on pre-labeled associated information of the combination to form a part of the feature tensor.

4. The method of claim 3, wherein the first feature vector, the second feature vector, and the third feature vector each comprise the associated information of the feature tensor which has been de-noised.

5. The method of claim 1, wherein determining the image features, the audio features, and the text features comprises:

determining the image features based on the reference image information using a video encoder;

determining the audio features based on the reference audio information using an audio encoder; and determining the text features based on the reference text information using a text encoder.

6. The method of claim 1, wherein the feature tensor corresponds to the first feature vector, the second feature vector, the third feature vector, and noise.

7. The method of claim 1, wherein the reference object is a human face.

8. An electronic device, comprising:

a processor; and a memory coupled to the processor and having instructions stored therein which, when executed by the processor, cause the electronic device to perform actions for training a model, the actions comprising:

determining image features, audio features, and text features of a reference object, in respective ones of a video encoder, an audio encoder and a text encoder, based on reference image information, reference audio information, and reference text information associated with the reference object, respectively;

constructing a feature tensor from the image features, the audio features, and the text features, the feature tensor defining a multi-dimensional space in which a given position within the multi-dimensional space corresponds to a combination of a corresponding image feature of the image features, a corresponding audio feature of the audio features, and a corresponding text feature of the text features, wherein a match type indicating a relationship between the corresponding image feature, the corresponding audio feature and the corresponding text feature is represented in the feature tensor as a particular one of a plurality of values each indicating a different match type;

decomposing the feature tensor into a first feature vector, a second feature vector, and a third feature vector corresponding to the image features, the audio features, and the text features, respectively, to determine a loss function value of the model, wherein the loss function value is computed at least in part based on a combination of a first absolute value of a difference between the first feature vector and one or more of the image features, a second absolute value of a difference between the second feature vector and one or more of the audio features, and a third absolute value of a difference between the third feature vector and one or more of the text features; and updating parameters of the model based on the loss function value.

9. The electronic device of claim 8, wherein determining the loss function value comprises:

determining the loss function value of the model based on the first feature vector, the second feature vector, the third feature vector, and the corresponding image features, audio features, and text features.

10. The electronic device of claim 8, wherein constructing the feature tensor comprises:

arranging the image features, the audio features, and the text features respectively along a first coordinate, a second coordinate, and a third coordinate to form a three-dimensional space, a given position in the three-dimensional space corresponding to a combination of the corresponding image feature of the image features, the corresponding audio feature of the audio features, and the corresponding text feature of the text features; and determining a value of the position based on pre-labeled associated information of the combination to form a part of the feature tensor.

11. The electronic device of claim 10, wherein the first feature vector, the second feature vector, and the third feature vector each comprise the associated information of the feature tensor which has been de-noised.

12. The electronic device of claim 8, wherein determining the image features, the audio features, and the text features comprises:

determining the image features based on the reference image information using a video encoder;

determining the audio features based on the reference audio information using an audio encoder; and determining the text features based on the reference text information using a text encoder.

13. The electronic device of claim 8, wherein the feature tensor corresponds to the first feature vector, the second feature vector, the third feature vector, and noise.

14. The electronic device of claim 8, wherein the reference object is a human face.

15. A computer program product comprising a non-transitory computer-readable medium having machine-executable instructions stored therein, wherein the instructions, when executed by a machine, cause the machine to perform actions for training a model, the actions comprising:

determining image features, audio features, and text features of a reference object, in respective ones of a video encoder, an audio encoder and a text encoder, based on reference image information, reference audio information, and reference text information associated with the reference object, respectively;

constructing a feature tensor from the image features, the audio features, and the text features, the feature tensor defining a multi-dimensional space in which a given position within the multi-dimensional space corresponds to a combination of a corresponding image feature of the image features, a corresponding audio feature of the audio features, and a corresponding text feature of the text features, wherein a match type indicating a relationship between the corresponding image feature, the corresponding audio feature and the corresponding text feature is represented in the feature tensor as a particular one of a plurality of values each indicating a different match type;

decomposing the feature tensor into a first feature vector, a second feature vector, and a third feature vector corresponding to the image features, the audio features, and the text features, respectively, to determine a loss function value of the model, wherein the loss function value is computed at least in part based on a combination of a first absolute value of a difference between the first feature vector and one or more of the image features, a second absolute value of a difference between the second feature vector and one or more of the audio features, and a third absolute value of a difference between the third feature vector and one or more of the text features; and updating parameters of the model based on the loss function value.

16. The computer program product of claim 15, wherein determining the loss function value comprises:

determining the loss function value of the model based on the first feature vector, the second feature vector, the third feature vector, and the corresponding image features, audio features, and text features.

17. The computer program product of claim 15, wherein constructing the feature tensor comprises:

arranging the image features, the audio features, and the text features respectively along a first coordinate, a second coordinate, and a third coordinate to form a three-dimensional space, a given position in the three-dimensional space corresponding to a combination of the corresponding image feature of the image features, the corresponding audio feature of the audio features, and the corresponding text feature of the text features; and determining a value of the position based on pre-labeled associated information of the combination to form a part of the feature tensor.

18. The computer program product of claim 17, wherein the first feature vector, the second feature vector, and the third feature vector each comprise the associated information of the feature tensor which has been de-noised.

19. The computer program product of claim 15, wherein determining the image features, the audio features, and the text features comprises:

determining the image features based on the reference image information using a video encoder;

determining the audio features based on the reference audio information using an audio encoder; and determining the text features based on the reference text information using a text encoder.

20. The computer program product of claim 15, wherein the feature tensor corresponds to the first feature vector, the second feature vector, the third feature vector, and noise.

\* \* \* \* \*